June 6, 1944. H. A. ROSELUND 2,350,708
PAN GREASING MACHINE
Filed Aug. 27, 1941 6 Sheets-Sheet 1
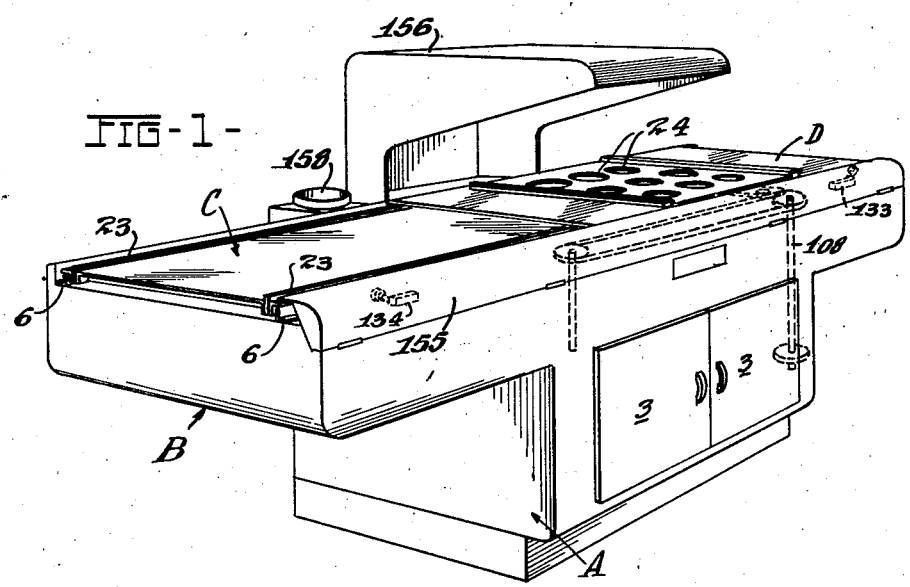
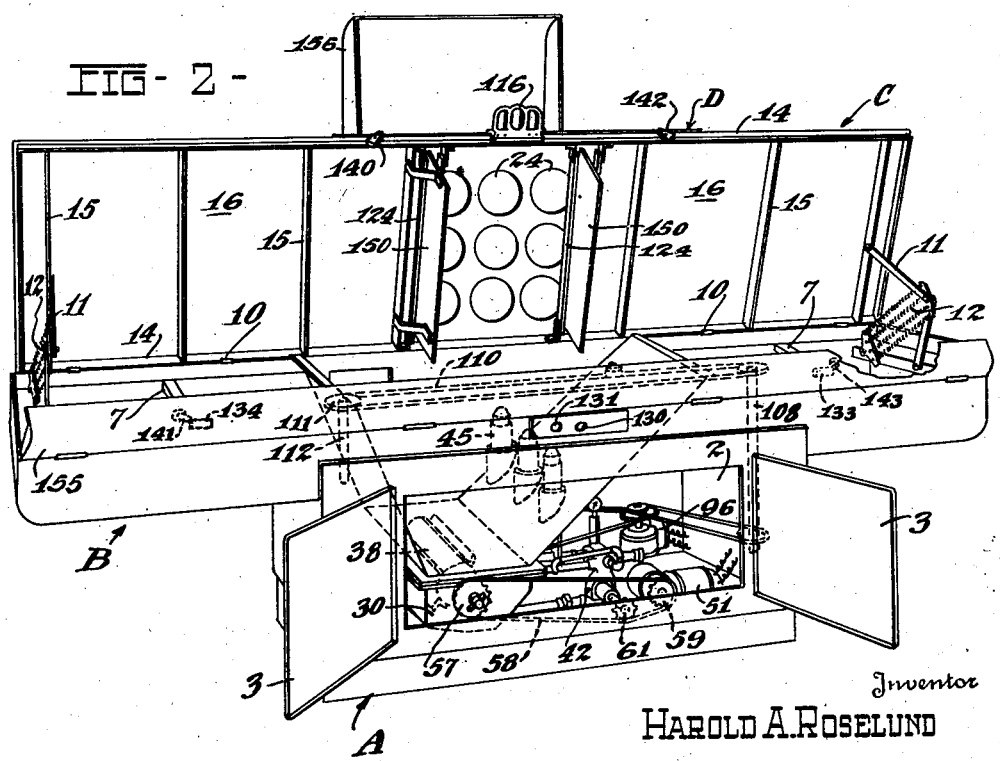
Inventor
HAROLD A. ROSELUND
By Owen & Owen
Attorneys

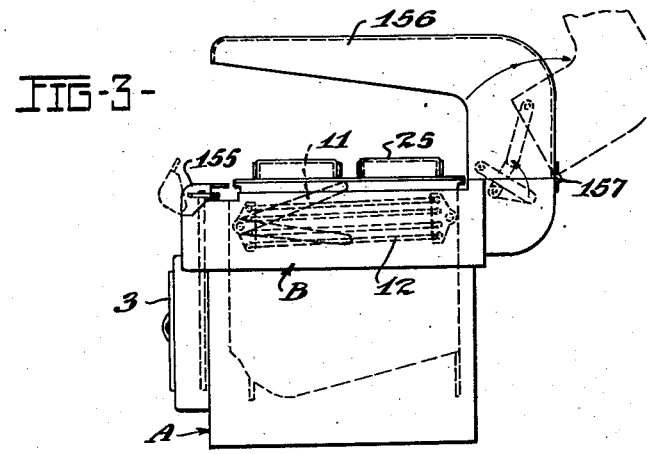
FIG-3-
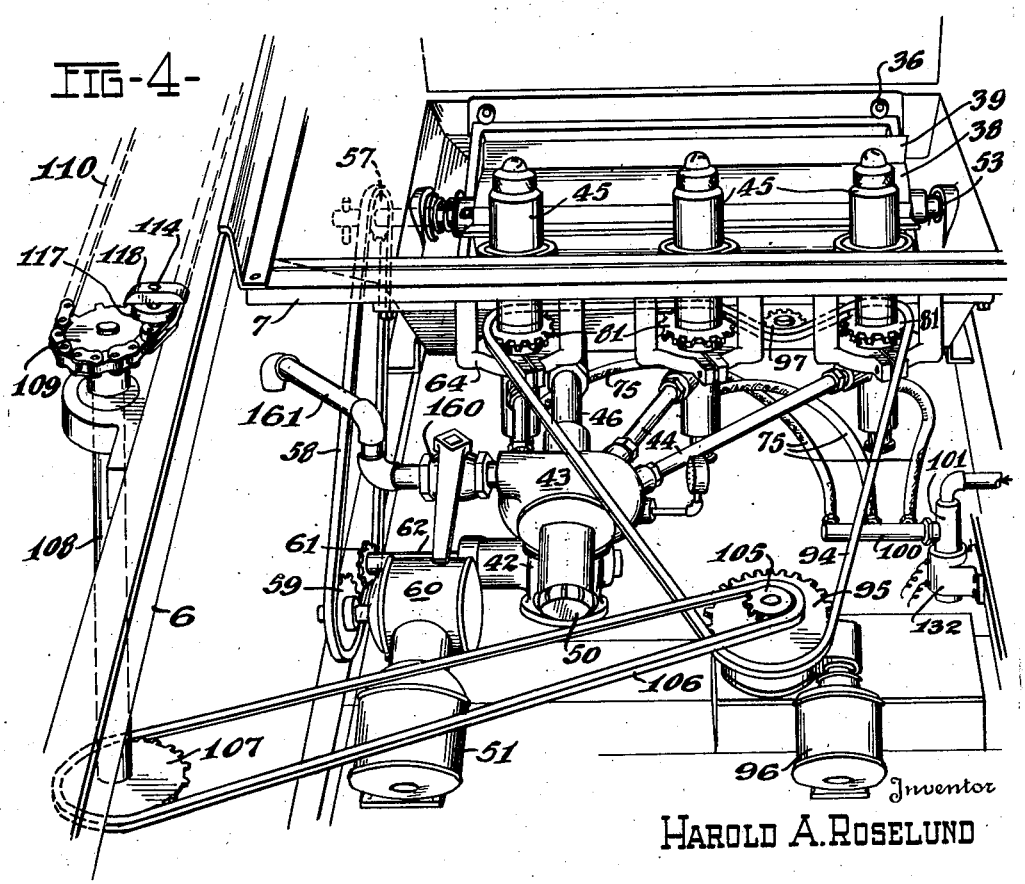
FIG-4-
Inventor
HAROLD A. ROSELUND

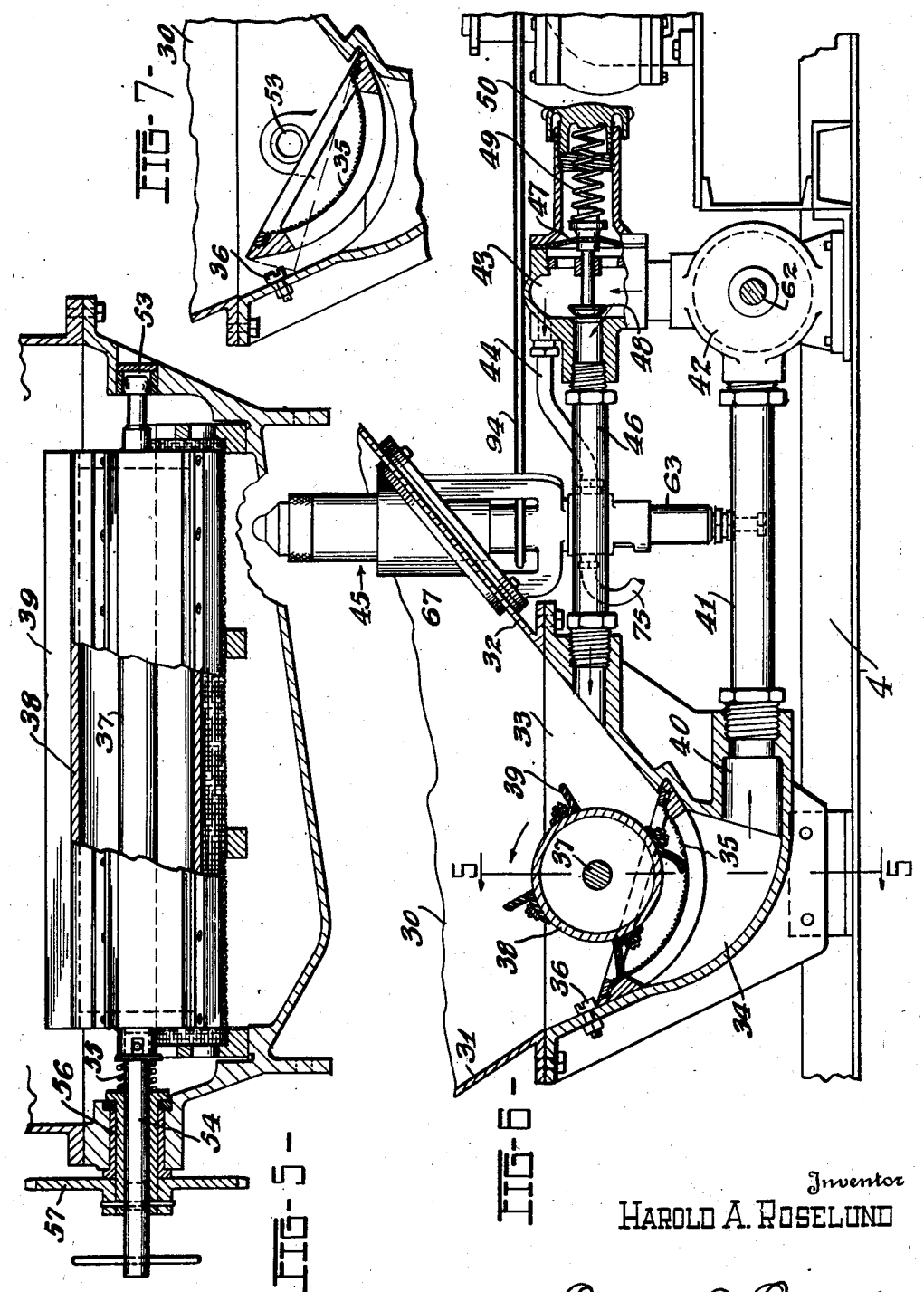

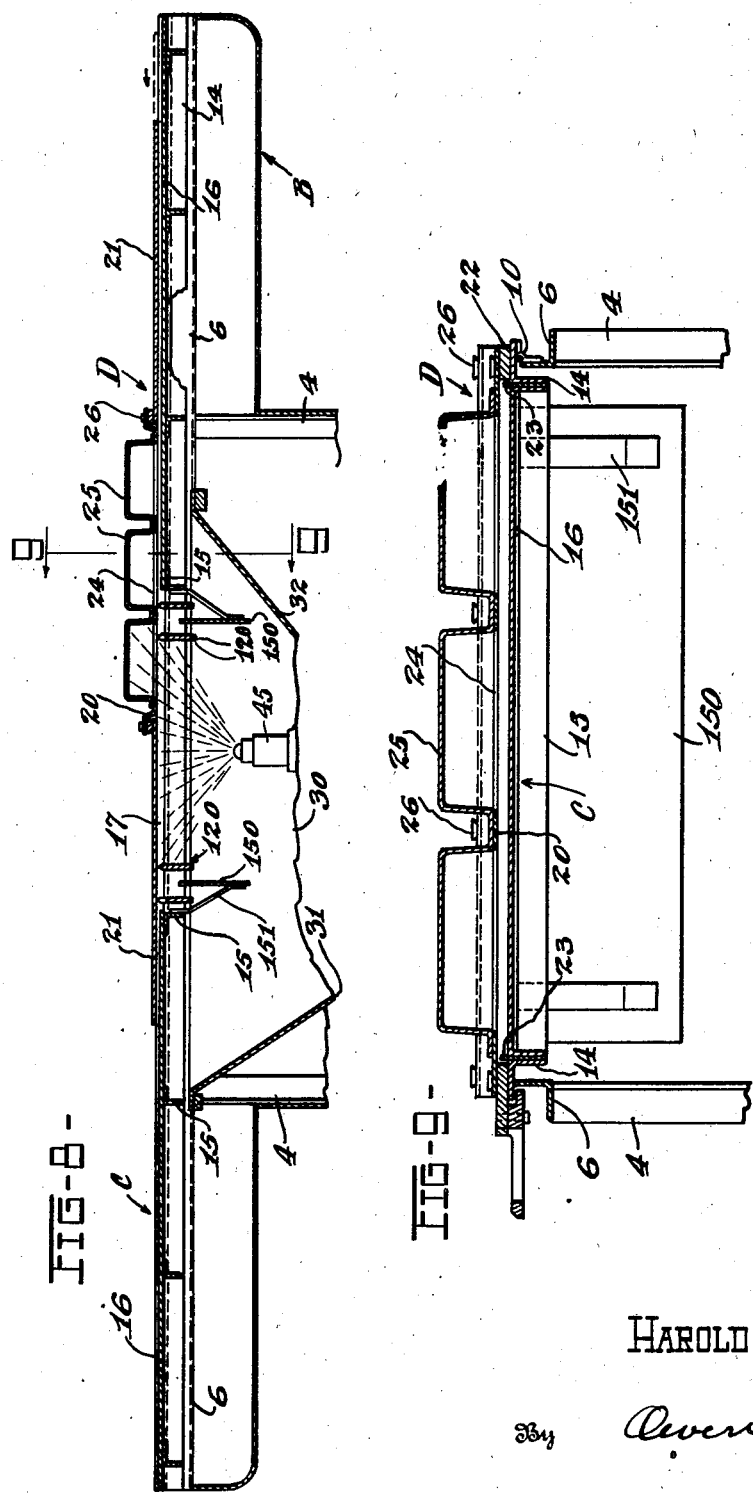

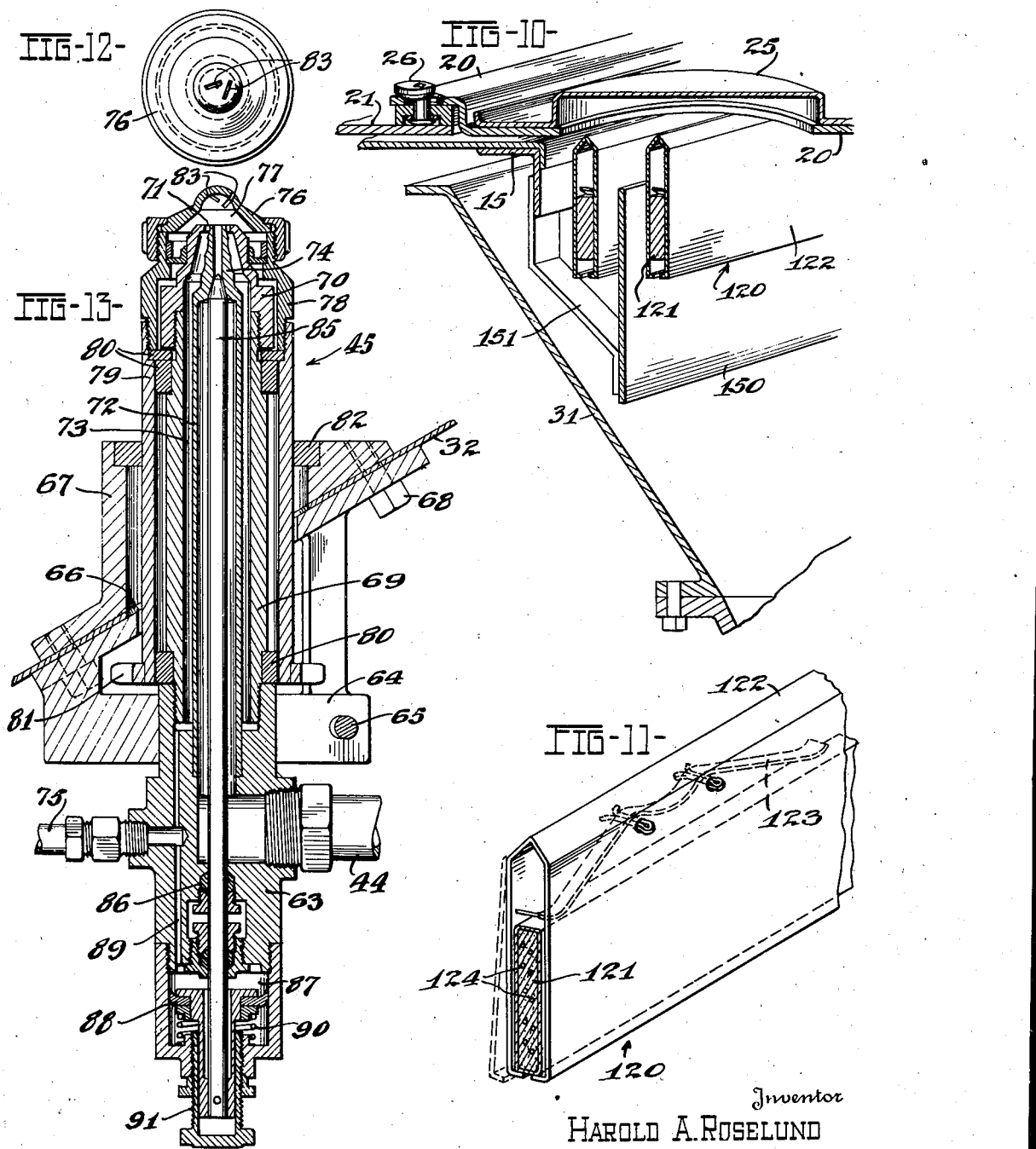

June 6, 1944.   H. A. ROSELUND   2,350,708
PAN GREASING MACHINE
Filed Aug. 27, 1941   6 Sheets-Sheet 6
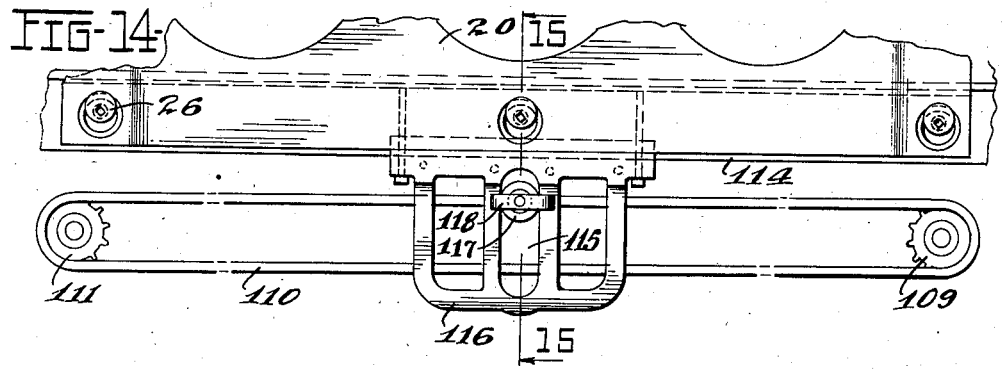
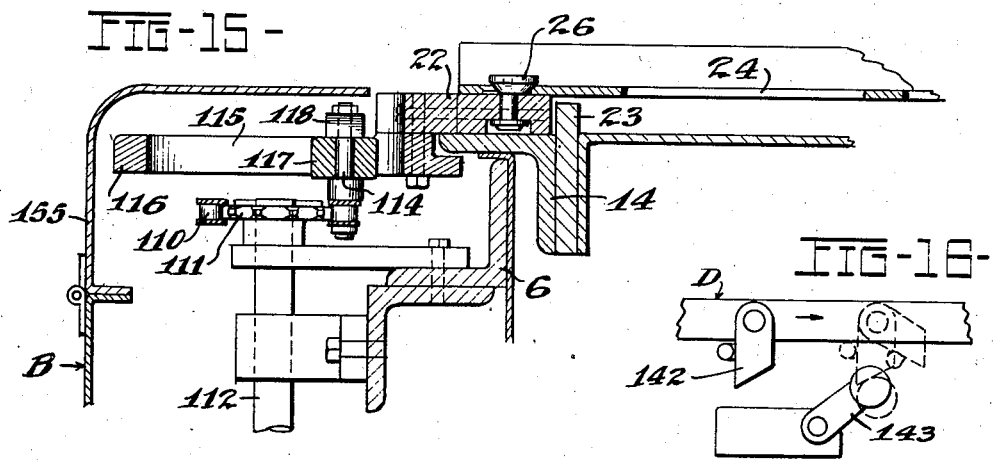
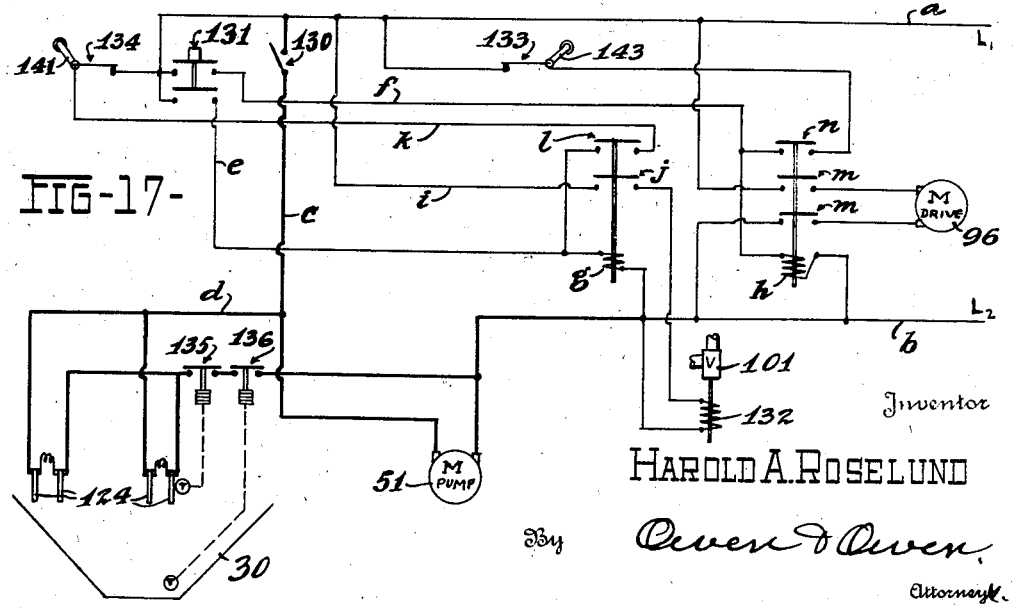
Inventor
HAROLD A. ROSELUND
By Owen & Owen
Attorney Patented June 6, 1944

2,350,708

UNITED STATES PATENT OFFICE 2,350,708

PAN GREASING MACHINE

Harold A. Roselund, Toledo, Ohio, assignor to The De Vilbiss Company, Toledo, Ohio, a corporation of Ohio Application August 27, 1941, Serial No. 408,542

21 Claims. (Cl. 91—44)

This invention relates to machines for spray-greasing pans preliminary to use in baking, and particularly to the greasing of pans of the multiple cavity type. These pans are of the type commonly used in bakeries, usually being of considerable size, and each provided with a plurality of cups or cavities, for instance nine as illustrated herein, for the baking of a corresponding number of cakes, pies, or the like.

In machines of this character it is customary to employ a sump containing grease of a semi-liquid nature to be sprayed; to position over such sump a shield plate on the top of which the pan to be greased is placed in inverted position, that is with the cavities thereof facing downward, the shield plate having openings therein substantially corresponding in shape and size to the open ends of the pan cavities and registering therewith, and to spray the grease up through the shield openings and into the pan cavities in contact with its bottom and side walls.

It is found in practice in the use of such machines that difficulty is encountered in effecting a thorough and uniform greasing of all the pan cavities; also by reason of the grease accumulating on the bottom of the shield plate and dropping in chunks into the sump and frequently having small chunks or particles thereof broken off or dislodged by the spraying action and carried into the pan cavities where they remain adhering to the walls; also in preventing crumbs, which sometimes remain in the pans and fall therefrom into the grease sump, from passing with the grease to the spray nozzles and stopping the spraying action; also in preventing all parts of the machine and particularly those with which the pan and shield plate are associated from becoming smeared with grease after being operated a short time, and thus rendering them difficult and unpleasant to handle and unsanitary and necessitating frequent cleaning.

The objects of the present invention are, among others, to obviate the difficulties and objections above-enumerated and to produce a machine of the character described of a nature and size particularly intended for use in small commercial bakeries and which is easy, simple and efficient in its operation and capable of use over a considerable period without necessity of cleaning and without liability of stoppage due to accumulation of crumbs or solid particles in the grease and consequently in the spraying passages.

The invention is fully described in the following specification, and one embodiment thereof illustrated in the accompanying drawings, in which—

Figure 1 is a front perspective view of a machine embodying the invention; Fig. 2 is a similar view with the canopy and top frame raised and with the doors of the base housing in open position; Fig. 3 is an end elevation of the machine; Fig. 4 is an enlarged top perspective view of the machine, with parts broken away and showing a portion of the operating parts; Fig. 5 is a fragmentary section taken on the line 5—5 in Fig. 6, with parts in full; Fig. 6 is a fragmentary longitudinal section of a portion of the grease sump and the grease circulating and spraying means in connection therewith; Fig. 7 is a fragmentary section similar to Fig. 6 of the bottom portion of the sump, with the bottom screen partly removed therefrom; Fig. 8 is a central longitudinal vertical section of the machine, with portions broken away and showing the relation of the pan carriage to the grease spraying means during an operation of the machine; Fig. 9 is an enlarged section on the line 9—9 in Fig. 8; Fig. 10 is an enlarged longitudinal vertical sectional view in perspective of a portion of the grease sump and carriage with associated scrapers for the pan shield; Fig. 11 is an enlarged fragmentary perspective view of one of the pan shield scrapers; Fig. 12 is a top plan view of one of the grease spraying guns; Fig. 13 is a central vertical section of one of said guns and its mounting in the sump; Fig. 14 is a fragmentary detail of the pan carriage and its driving means; Fig. 15 is an enlarged fragmentary vertical cross-section taken on the line 15—15 in Fig. 14, with some parts added; Fig. 16 is a front elevation, somewhat in diagram, of one of the carriage actuated trip switches with associated carriage trip, and Fig. 17 is a wiring diagram of the electrical controls.

Referring to the drawings, A designates a base housing enclosing certain of the operating parts of the machine and to which access is had through a front opening 2 that is closed by doors 3 (Figs. 1 and 2). This housing includes suitable frame parts fragmentarily shown at 4 in Figs. 6, 8 and 9 and supports a horizontally disposed table structure B of elongated rectangular form which, in the present instance, projects at its ends beyond the ends of the housing A.

At the top portion of the table structure B, at each side thereof, is disposed a longitudinally extending frame bar 6, which is disposed in spaced parallel relation to its companion, and, in the present instance, is of angle iron form with one flange extending upwardly and the other forming a bottom outwardly extending flange, as best shown in Figs. 1, 4, 9 and 15. In the present instance, the table structure B is of skeleton form, the bars 6 being supported by the upright members 4 of the base frame and being braced apart at intervals by suitable cross pieces 7.

The table structure B is covered by a top member C which is hinged at its rear edge to the rear table bar 6, as shown at 10 (Figs. 2 and 9), to permit a raising of the cover member to render access to parts within the base housing A and table B. The table structure and top member are connected at their ends by sets of toggle links 11, and these are acted on by counterbalancing springs 12 to facilitate raising of the top. The top C is of elongated rectangular form corresponding substantially to the size and shape of the table. The top C includes front and rear side frame bars 14, 14, spaced apart at their ends and at suitable intervals lengthwise thereof by cross-bars 15 (Figs. 2, 8, 9 and 10). The frame forming the top C is closed on its top, except at its central portion, by sheets 16 preferably, but not necessarily, of sheet metal. The space between the inner ends of the sheets forms an opening shown at 17 in Fig. 8 through which spraying of pans moved over the opening may occur as hereinafter described.

A carriage D is mounted on the top C for guided movements lengthwise thereof. This carriage, which is for the purpose of carrying pans to be greased, is provided at its central portion with a shield plate 20 on which the pans to be greased are placed in inverted position, and the carriage at each side of the shield plate lengthwise thereof is provided with an apron sheet 21 of sufficient length to cover the opening 17 when the shield plate 20 has been moved to one end or the other of the spraying opening 17, or substantially so, as best shown in Fig. 8. The apron sheets 21 are secured at their front and rear edges on the tops of respective runner bars 22 which slidingly rest on the top flanges of the table frame bars 14. A longitudinally extending guide strip 23 is secured to the inner side of each frame bar 14 and projects upwardly therefrom a short distance at the inner side of the respective carriage runner 22, serving as guiding means for the carriage when lengthwise reciprocated on the top C.

The shield plate 20 is provided with a plurality of openings 24 corresponding in shape to and adapted to register with respective cavities of a multiple cup baking pan 25 placed in inverted position thereon, so that upward spraying of grease through the shield openings will reach and completely cover the bottom and side walls of the pan cavities, as well understood in the art. The end edges of the shield plate are raised and outwardly flanged to rest on crosspieces 25 secured along the tops of the respective inner edges of the apron sheets 21 of the carriage. Locking pieces 26 are carried by these strips and have eccentric heads which may be projected through openings in the shield flanges and then turned to lock the shield to the strips as best shown in Fig. 10. The front and rear edges of the shield 20 extend over the front and rear runners 22 of the carriage and are secured thereto by similar locking pieces 26, as shown in Fig. 15. It will be understood that any number of shields 20 may be provided to suit the different styles of baking pans used and that these may be interchangeably mounted on the carriage.

Mounted within the base housing A beneath the opening 17 of the top C is a grease sump 30. This sump has its opposing end walls 31, 32, disposed in diverging relation so as to direct grease falling thereon down into the restricted trough-like bottom portion of the sump. The upper ends of the walls 31 and 32 terminate adjacent to the top C, when the latter is in closed position, and in outwardly spaced relation to the respective end of the top opening 17, as best shown in Fig. 8. The trough-like bottom of the sump 30 is divided into an upper chamber 33 and a lower chamber 34 by a screen 35, the frame of which removably fits in the bottom portion of the sump, as best shown in Figs. 6 and 7, to permit removal for cleaning and replacement purposes. For the purpose of such removal, the nose or right hand edge of the screen frame fits into a recess in the wall 32, while the opposite edge of the frame is engaged by an eccentric rotary locking head 36 to hold the screen in seated position. The screen 35 is of arcuate form lengthwise of the machine, with its concaved side facing upward. The screen is provided, primarily, to prevent large crumbs and other large particles from reaching and clogging the spray nozzles.

Mounted on a shaft 37 disposed above the screen 35 and lengthwise of the trough chamber 33 is a rotor 38 of cylindrical form, provided around its periphery with a plurality of flexible wiper blades 39. These blades are intended to wipe against and be flexed by the concaved surface of the screen 35 during rotation of the rotor and to act in the manner of a rotary pump to cause grease disposed in the trough chamber 33 to be forced through the screen into the bottom chamber 34. To facilitate this pumping action, the axis of the rotor 38 is set eccentric to the arc of the screen 35, so that the space between the screen and rotor body is greater at its entrance than at its exit end, thus causing an increasingly greater bending of the blades back toward the rotor body as they move in wiping engagement with the screen. The rotor turns in counterclockwise direction (Fig. 6), and the restriction of said space is from left to right in said figure.

This rotor wiper, in addition to tending to force the grease through the screen 35, also serves as an agitating means for the grease to render or maintain it in a more fluid condition than it would be if permitted to stand without agitation. It also serves to break up crumbs which may fall into the sump from the pans not thoroughly cleaned before spraying and which, if not finely broken up, might cause a clogging of the screen and thus interfere with the flow of grease and make frequent cleaning necessary. Fine crumb particles small enough to pass through the screen are not large enough to clog the spray nozzles. Lumps of the grease are also broken up or disintegrated by the action of the rotor wiper.

The bottom chamber 34 of the sump deepens, as shown in Fig. 5, towards one point at which an outlet 40 is provided which connects through a pipe 41 (Fig. 6) with the suction side of a pump 42, in this instance of the rotary type. The grease is discharged from this pump into a pressure equalizing chamber 43 from which it is distributed through pipes 44 to respective spray guns 45 and also through a return pipe 46 to the sump. The pressure developed by the flow of grease through the chamber 43 acts upon the diaphragm 47 and holds the valve 48 open. The latter is inclined toward its seat at the entrance of pipe 46 by the spring 49, or by any other suitable means, for instance by regulated air pressure. The tension of the spring and hence the pressure within chamber 43, through the position of the valve 48, is varied by turning the screw member 50. As the pump delivers many times as much grease as is required by the spray guns there is a continuous flow of grease through the return pipe 46.

The rotor 38 has one end of its shaft 37 mounted in a socket bearing 53 in one end of the sump trough, while its other end is releasably engaged by a stub shaft 54 which is mounted for rotary and limited axial movements in the opposite end of the trough, as shown in Fig. 5. The shafts 37 and 54 are yieldingly retained in clutch engagement by a coiled expansion spring 55 which bears at one end against a bearing sleeve 56 and at its other end against a flange on the shaft 54. The shaft section 54 has sliding non-rotatable connection with the bearing sleeve 56 to permit relative axial movements thereof for the purpose of engaging or disengaging the clutch connection of the two shafts. A sprocket wheel 57 is mounted on the sleeve 56 and is driven by a chain 58 from a sprocket wheel 59 driven by the motor 51 through a reduction gearing in the case 60. The chain 58 also engages and drives a sprocket wheel 61 on the pump shaft 62. It is thus apparent that the motor 51 is utilized both to drive the agitating rotor 38 and the rotor of the pump 42.

The spray guns 45, in the present instance three in number, are projected through the sump wall 32 in position to direct their discharge of grease upwardly against the shield plate 20 and into the cavities of the pan 25 as they are exposed to the adjacent end portion of the sump 30 during a movement of the pan carriage D to the left, or during what may be termed its "forward" stroke, after a pan has been placed on the shield at the right hand end of the machine or at the beginning of a cycle of movements, as hereinafter described.

Each spray gun 45 (see Fig. 13) includes a body part 63 securely held at its upper end by a split clamp 64 and cooperating screw or bolt 65, which clamp is disposed at the under side of the sump wall 32 around an opening 66 therein and is secured to said wall and to the flanged lower end of a sleeve member 67, on the upper side of said wall, by screws 68. A barrel 69 fixedly rises from the upper end of the body 63, in the present instance being threaded in a socket therein, and extends up through the sump wall opening 66 and member 67 in spaced relation thereto and into the sump 30. A spray nozzle 70 is threaded, or otherwise suitably mounted, on the upper end of the barrel 69 and is provided centrally at its upper end with an air discharge orifice 71. A tube 72 for the passage of the material to be sprayed, grease in the present instance, is disposed within the barrel 69, in spaced relation thereto, to provide an air passage 73 therebetween and is fixedly mounted in any suitable manner at its lower end to the body 63. The tube 72 terminates at its upper end in a material discharge nozzle 74 which projects into the air discharge orifice 71 in spaced relation thereto, so that air discharging from the orifice 71 in surrounding relation to the orifice of the nozzle 74 will act on the material to be sprayed in a manner well understood in the art. The air passage 73 in the barrel 69 has communication at its lower end through a suitable passage in the body 63 with a tube 75 leading to any suitable source of air pressure supply, while the lower end of the tube 72 has communication through a passage in the body 63 with a respective material supply tube 44 leading from the pressure regulating chamber 43.

In order that the spray delivered from the nozzles 70, 74, of the spray gun may be caused to have a whirling action so as to be more efficiently and uniformly delivered to the cavity walls of a pan 25 passing over the sump, a cap 76 is mounted over said nozzles in a manner to form a mixing chamber 77 within the cap. This cap is carried through an intermediate connection 78 at the upper end of a sleeve 79 which surrounds the barrel 69, having bearings 80 at top and bottom thereon to permit free rotation of the sleeve and its cap relative to the barrel and nozzles. The sleeve 79 extends down through the member 67, sump wall opening 66 and a portion of the bracket 64 and has a sprocket wheel 81 at its lower end in exposed position within said bracket. A gasket 82 is carried by the upper end of the member 67 and coacts with the sleeve 79 to prevent leakage of grease from the sump between the sleeve and member. The spray cap 76 is provided with spray discharge openings suitably arranged to effect an efficient discharge of spray from the chamber 77. In the present instance, these openings are two in number and in the form of slots 83 arranged in angular relation to each other, one being adjacent to the axis of the cap and the other preferably being spaced therefrom, as shown. Suitable gaskets are placed at intervals between the nozzle 70 and the rotating part 78 to prevent a spray mixture or grease from passing from the cap chamber 77 down within the rotating parts.

The material discharge nozzle 74 has its orifice normally closed by a needle valve 85 which extends down through the tube 72 and suitable packing glands 86 in the body 63 into an air pressure chamber 87 provided at the outer end of the body. A plunger 88 is fixed to the needle 85 within said chamber and is exposed at its inner side to air pressure within the supply connection 75 through a passage 89, so that air pressure, when turned into the spray gun, is utilized to open the needle valve against the tension of a seating spring 90 acting against the opposite side of said plunger. The extent of opening of the needle valve is regulated by the adjustment of a sleeve member 91 threaded in the outer end of the part in which the plunger operates and in position for its inner end to coact with the plunger.

The rotary sleeve 79 of the several spray guns 45 are driven in unison by a common sprocket chain 94 (Fig. 4), which connects the several sprocket wheels 81 of the guns to a drive sprocket 95 connected to and driven by a motor 96. An idler sprocket 97 engages the chain at one side of the sprocket wheel 80 of the center gun to loop the chain partially around such wheel.

It is apparent that the spray discharge cap 79 and sleeve 79 are the only parts of the spray gun which are rotated, thus permitting the utilization of fixed air and grease passages up to the discharge orifices of the air and material nozzles 70, 74, and obviating the necessity of providing rotating joints and parts therefor. In other words, no rotating joints, which ordinarily cause considerable trouble from a leaking stand-point, are necessary in connection with the regular passages for the grease and air. The only joint necessary to prevent leakage from the sump around the gun is that effected between the sleeve member 67 and rotary sleeve 79 through the gasket 82, which latter is readily accessible for inspection and replacement.

The air pressure supply tubes 75 for the several spray guns are shown in Fig. 4 as connecting with a common supply line 100 having a normally closed solenoid control valve 101 therein, the operation of which, in proper coordination with the movement of the pan carriage, will be hereinafter described.

The subject-matter of the spray gun per se, including the rotary cap feature, is covered by a divisional co-pending application Serial No. 533,692, filed May 2, 1944.

The motor 96, in addition to driving the rotary spray caps of the several guns, also serves as the driving means for the pan carriage D. For this purpose, a sprocket 105 on the shaft with the sprocket 95 is connected by a sprocket chain 106 (Figs. 1, 2 and 4) to a sprocket wheel 107 carried at the lower end of a vertical shaft 108 mounted in suitable brackets within the front portions of the base frame A and table structure B at the right side thereof. The upper end of this shaft carries a sprocket wheel 109 adjacent to and in advance of the front edge of the table structure B. An endless drive chain 110 for the carriage D is disposed lengthwise of the table top and is looped around and connects the drive sprocket 109 to an idler sprocket 111 mounted on a shaft 112 attached to the front side of the table structure B. The run of the chain 110 is of sufficient length to take care of the desired travel of the pan carriage D and is connected to the front side of the carriage substantially intermediate its ends by a pin 114 on the chain extending up through and working in a cross opening 115 provided in a bracket 116 projecting over the chain from the front carriage runner 22 (Figs. 14 and 15). The drive pin 114 preferably carries a roller 117 to facilitate movements of the drive pin in the bracket opening.

A cycle of movements of the machine during a pan greasing operation comprises a single movement of the drive pin 114 throughout the complete length or run of the chain 110, and such movement starts with the pin at the right hand end of the inner run of the chain. It will thus be apparent that during a cycle of movement of the chain the pin 114 in cooperation with the bracket 116 causes the pan carriage D to move from the extreme right of its run to the extreme left thereof, at which point the pin shifts in the bracket to the outer run of the chain and the carriage will then be returned to the right hand end of it run and will stop at the initial starting position, as hereinafter described. The bracket 116, in addition to serving as a guide for the drive pin, also serves as a handle for lifting the top C to its raised position shown in Fig. 2. A crosspiece 118 on the upper end of the pin 114 coacts with the bracket 116 to retain it in guiding relation to the drive pin, and a turning of such crosspiece into register with the guide opening 115 permits raising of the bracket from engagement with the pin.

In the upper portion of the sump 30 and adjacent to each end of the opening 17 in the top structure C is provided, in the present instance, a pair of scrapers 120 spaced lengthwise of the table and having their upper edges positioned to scrape the under side of the carriage aprons 21 and shield plate 20 as the carriage reciprocates. These scrapers are disposed crosswise of the travel of the carriage and each comprises a bar 121 (Figs. 10 and 11), and a plurality of scraper strips 122 mounted on the bar in successive relation lengthwise thereof. The bars 121 are attached to the top structure C, being secured at their ends to the front and rear side bar members of such structure. Each scraper strip 122 is of sheet metal, or other suitable material, and of inverted U-shape in cross-section to adapt it to straddle the bar, and has its top loop portion of inverted V-form in cross-section to provide a scraping edge, while the ends of its legs are inwardly flanged under the bar to limit the upward movement of the strip relative to the bar. Spring means 123 are disposed within each scraper strip between its top or loop portion and the bar, so as to yieldingly retain the scraper strip in raised position relative to the bar and permit it to have lengthwise rocking movements on the bar to accommodate itself to any irregularity in the under surface of the carriage and pan shield as they move thereover. The legs of the strip have sliding contact with the side walls of the bar 121.

The bars 121 preferably include electric resistance wires 124 so as to serve as electric heaters. It will be understood that the heat from the bars 121 is transmitted to the scrapers 122 and this heat not only facilitates removal of the grease from the under side of the shield plate 20 and carriage aprons 21, but prevents the grease from adhering to and building up on the scrapers. This heating of the grease, which is scraped from the carriage and shield and returned to the sump, tends also to maintain the grease in the sump at desired working consistency.

It is found desirable in practice that the temperature of the sump grease be maintained at approximately from 85° to 95° F., so that it will have sufficient flowing capacity to drop freely from the scrapers and to flow easily through the circulating and spray gun feeding passages. In order to properly regulate the temperature of the grease, it is desirable to have the heater circuit controlled by two thermostatically operated switches, one responding to the temperature of the scraper and one to the temperature of the grease in the sump. It is found desirable in practice to have the control for the heater switch set to open at a limit of approximately 150° F. at the scrapers and to have the control for the sump switch open when the temperature of the grease in the sump is approximately 90° to 95° F.

Referring to Fig. 17, it will be noted that the electrical control for the machine includes two circuits, one of which is controlled by a main or manual switch 130 of the selective type and includes the pump motor 51 and the heaters 124. The other circuit is controlled by a main push button switch 131, and includes two relay circuits, one controlling the drive motor and the other the solenoid 132 which, when energized, opens the air valve 101 for the spray guns. The motor relay circuit also includes a normally closed limit switch 133 while the other relay circuit includes a normally closed limit switch 134. When the switch 130 is closed, it closes the connection c between the main lines a and b with the pump motor 51, and at the same time closes the connection d with the heaters 124, thereby causing the pump motor and heaters to work in unison, except that the heater circuit has two thermostatically controlled switches 135 and 136 disposed therein, one being opened when the temperature at the heaters reaches a predetermined high limit and the other being opened when the temperature of the grease in the pump reaches a predetermined high limit.

When the push button switch 131 is closed it closes the main circuit line $a$ to the two lines $e$ and $f$, the former connecting with the main line $b$ through the relay coil $g$, while the latter connects with the line $b$ through the relay coil $h$, thus closing the two relay circuits. The closing of the relay circuit $g$ closes a shunt circuit $i$ (in which the valve operating solenoid 132 is disposed) through the switch $j$ and also closes the shunt circuit $k$ (in which the limit switch 134 is disposed) through the relay switch $l$. It is apparent that the relay coil $g$, having once been energized by a closing of the switch 131, remains energized after such switch has been opened due to the closing of the coil connection through the shunt circuit $k$ by the closing of the relay switch $l$, so that the air valve solenoid remains active until the limit switch 134 has been opened. The opening of this switch breaks the line connection through the relay coil $g$, so that its circuit is now completely dead.

The closing of the relay circuit $h$ closes the connection of the drive motor 96 with the line wires through the two switches $m$, $m$ and also closes the shunt circuit $f$ with the line through the relay switch $n$. When the limit switch 133 is opened the line connection of the relay coil $h$ is broken, thus permitting the relay switches $m$, $m$ and $n$ to open and stop the drive motor 96.

The driving of the motor 96 effects a driving of the chain 110, which moves the carriage D first to the left and then back to starting position, due to the engagement of the drive pin 114 of the chain with the carriage bracket 116. When the carriage has substantially reached the limit of its left hand movement, a trip finger 140 on the front edge of the carriage D (Fig. 2) will have moved into engagement with the arm 141 of the limit switch 134 and effected a momentary tripping of such switch to open the shunt circuit $k$ in which disposed, thereby causing a deenergizing of the relay coil $g$ and a consequent closing of the air valve 101. The motor 96, however, continues to drive the carriage D and causes it to return to its starting position. Just prior to reaching such position, the right hand trip finger 142 on the front edge of the carriage D engages the arm 143 of the right hand limit switch 133 and effects a momentary opening of such switch. When this opening occurs, the relay coil $h$ is deenergized, thus permitting the relay switches $m$ and $n$ to open and stop the drive motor.

Each of the fingers 140 and 142 is pivotally suspended from the front side edge of the carriage D and has stop coaction with the carriage to permit the finger to swing in only one direction from vertical position relative to the carriage. The finger 140 can swing only in clockwise direction, while the finger 142 can swing only in counterclockwise direction. Each finger has its outer end inclined in opposition to its stop side, the incline of the finger 140 to the left and the incline of the finger 142 facing to the right. It is thus apparent that when the carriage has moved approximately to the limit of its left stroke the inclined face of the finger 140 will ride over and cause a depression of the switch arm 141 and a consequent opening of the air control valve 101, and when the carriage D has returned approximately to starting position, the beveled end of the finger 142 will ride over the switch arm 143 and effect an opening of the switch 133 and a consequent opening of the drive motor circuit. Each finger 140, 142 is prevented from swinging from vertical position when it is moving in switch opening direction across the respective arms 136 and 143, but if it entirely crosses the switch arm during its switch operating movement, it is permitted to swing back freely from tripping position when it passes over the switch arm in the succeeding stroke of the carriage.

Two baffle plates 150 are attached to the under side of the top structure C in position to project down a distance within the top portion of the sump 30 at opposite sides of the spray nozzles 45 and adjacent to respective end portions of the sump, so as to restrict the spraying area and prevent any of the spray from passing out over the upper edges of the end walls 31, 32, of the sump. These baffle plates are carried by brackets 151 projecting down from the cross-bars 15 at the respective edges of the top opening 17, and the upper edge of each plate projects up a short distance between the heaters 120 of the adjacent pair, as best shown in Figs. 2, 8 and 10. These baffles also cooperate with the scraper bars to prevent the grease spray from passing out between the sheets 16 of the top C and the apron sheets 21 of the carriage D.

The front top edge of the table structure B is provided with a guard or hood 155 which extends the entire length of the table edge and in covering relation to the exposed trip and carriage driving parts at such edge and is hinged to the table to permit access to such parts.

A canopy 156 is provided over the central portion of the carriage above the table opening 17 and is hinged to the rear top edge of the table structure B, as shown at 157 (Fig. 3). A vent passage from the upper interior portion of the sump is provided at 158 (Fig. 1) and is intended to have connection with a lead-off conduit and any suitable draft creating means, as well understood in the art.

The operation of the machine is as follows. The desired quantity of grease having been placed in the sump 30, the operator first closes the manual control switch 130 to start the pump motor 51 and to effect a heating of the heaters 124. This causes a driving of the pump 42 and agitating rotor 38, so as to effect a beating of the grease within the sump chamber 33 and a circulation of the grease through the circulating system, which includes the connection 41, pump 42, pressure chamber 43 and return connection 46, the valve 48 being held open for such purpose when a predetermined pressure has been created in the pressure chamber. The heat generated by the heaters 124 also tends somewhat to thin the grease to proper working condition. There is not, however, during this action any spraying of the grease. When the grease has been thinned the desired extent by this initial agitating, heating and circulating action, the operator presses the push button switch 131 to close the drive motor and air valve control circuits. As soon as the switch 131 is closed the relay coils $g$ and $h$ in the two relay circuits are energized, and this energizing continues after such switch has been due to the automatic closing of the relay switches *l* and *n*. Instantly upon closing the switch 131 the motor 96 is started and the air valve 101 is opened by an energizing of the solenoid 132, thus effecting a flow of air through each of the spray guns and a consequent opening of the gun valves 85. The motor 96 rotates the spray head cap of each of the spray guns and at the same time operates the pan carriage drive chain 110 to move the carriage first to the left and then to return it to starting position, a pan to be sprayed having been placed on the carriage over the shield plate 20 before the starting of such movement. As the pan and shield plate move over the table opening 17, the grease spray discharge from the guns 45 enters the pan cavities through the shield and effects a thorough spraying of such cavities. When such spraying of the pan has been effected and the carriage D has moved substantially to the limit of its forward or left hand stroke, the left hand trip finger 140 thereon passes over the switch arm 141 in engagement therewith and effects a momentary opening of the limit switch 134. This breaks the circuit in which the relay coil *g* is disposed and permits a deenergizing of the solenoid 132 and an opening of the valve 101, so that the spraying action is discontinued. The driving action of the chain 110 is continued, however, so as to return the carriage to starting position to complete a pan greasing cycle. When the carriage in this return movement has approximately reached its starting position, the right hand trip finger 142 thereon passes over the switch arm 143 in engagement therewith and effects an opening of the limit switch 133. When this occurs, the circuit in which the relay coil *h* is disposed is opened, thus permitting an opening of the relay switches *m*, *m* and *n* and stopping the motor 96. It will be understood that the control of the pump motor and heater circuits is manual, being maintained so long as the machine is being operated, while the control of the drive motor and air valve control circuits is manual in the first instance by a pressing of the switch button 131 and is then automatic during the remainder of a cycle. With this particular machine it is necessary to manually close the switch 131 for each cycle or greasing operation. During each stroke of the pan carriage, the scrapers 122 engage the under side of the pan shield 20 and also the portions of the apron shields 21 which move thereover and scrape the adhering grease therefrom. The heating of the scrapers is important, inasmuch as it more efficiently removes the grease from said parts and also prevents the grease from adhering to and piling up on the scrapers and the incident frequent cleaning of the scrapers. This heating is also important in that the return to the sump of the heated grease which runs or drips from the scrapers tends to maintain the desired fluidity in the sump grease for efficient operation of the spray guns. Should the temperature at the heaters rise above a predetremined limit, the associated thermostat control will open the heater circuit switch 135, and should the temperature of the grease in the sump rise above a predetermined limit, the thermostatically controlled switch 136 in the heater line will be opened, thus in either instance cutting off the heaters from the supply circuit until the temperature in the respective places has been reduced below the limits for which the thermostatic controls are set.

When it is desired to remove the grease from the sump, the pump motor is operated with the valve 160 (Fig. 4) open, so as to permit the discharge of grease from the pressure chamber 43 through an outlet tube 161.

The use of the agitator 38 is important, as it not only agitates and tends to maintain the sump grease in proper condition for spraying, but also has a pumping action to assist the pump 42 in the circulation of the grease and at the same time has a further tendency to thin the grease by forcing it through the screen 35. This latter action is also important in that it tends to break up or disintegrate any solid particles, such as crumbs or the like, which may be present in the grease and which otherwise would pass to and effect a clogging of the gun nozzles 74 or discharge orifices 83 in the rotary cap.

Having thus described my invention, what I claim as new, and desire to secure by United States Letters Patent, is:

1. In a pan greasing machine wherein a pan carriage moves over grease spraying means and over a grease sump, a scraper means disposed above the sump to engage and scrape grease from the under side of parts of said carriage which move over the sump and deliver it to the sump.

2. The combination as called for in claim 1, including heating means for the scraper means to facilitate removal of grease from the carriage parts and its flow from the scraper.

3. The combination as called for in claim 1 in which the scraper means includes yieldingly mounted scraper parts in engagement with the under side of the carriage.

4. A combination as called for in claim 1 in which the scraper means includes a bar constituting an electric heater element and scraper strips straddling and protecting the bar and being yieldingly mounted thereon.

5. In a pan greasing machine including a grease sump, pan carrying means movable over the sump and means within the sump for spraying a pan carried by said carrying means, the combination of scraper means beneath the carriage and above the sump disposed to scrape grease from under surfaces of said carrying means as it moves over the sump and to deliver the grease to the sump, said scraper means including a plurality of yieldingly mounted scraper parts in engagement with the under side of the carrying means and which accommodate themselves to irregularities in the coacting surface of the carrying means.

6. In a pan greasing machine wherein a pan carriage moves over grease spraying means and over a grease sump, a pair of spaced scrapers disposed within the upper portion of the sump at each of opposite sides thereof and crosswise of the line of movement of the carriage, said scrapers having scraping engagement with under surfaces of the carriage to remove grease therefrom and return it to the sump, and a vertically disposed baffle plate disposed within the upper portion of the sump at each side thereof and projecting up between the associated pair of scrapers in spaced relation thereto and extending a distance below said scrapers.

7. In a machine of the class described, a table structure including a grease containing sump, a top hinged to the table structure for tilting movements relative thereto and having an opening over the sump, a pan carriage movable across said opening to expose a pan carried thereby to the interior of the sump through said opening, and means for spraying grease upward from the sump through said opening against a pan movable thereover, said carriage being carried by said top and tiltable therewith.

8. In a machine of the class described wherein pan carrying means is movable over a grease sump and a spray gun contained therein, which gun is operable to spray the under side of a pan movable thereover by the carriage, of means for maintaining the grease in spraying consistency and feeding it under predetermined pressure to the gun, said means including a combined grease agitating and pumping means within the bottom portion of the sump and a pump between the sump and the gun.

9. In a machine of the class described, the combination with a reciprocably movable pan carriage, a spray gun for spraying a pan with grease during a portion of its movement with the carriage, means for feeding grease to the gun, an air pressure control valve for the gun, and means operable to move the carriage through a predetermined cycle, of two separate electrical controls, one for the grease feeding means and one for the valve and the carriage operating means, the latter control being automatically operable first to close said valve and stop the spraying action of the gun at one point in a cycle of movement of the carriage and then to stop the carriage operating means at another point in such movement.

10. A combination as called for in claim 9 wherein electric heaters for the grease are provided in the control for the grease feeding means.

11. A combination as called for in claim 9 wherein the control for said valve and carriage operating means includes two relay circuits each having a limit switch therein which is automatically opened by the carriage at a respective point in its movement, one relay circuit controlling the valve and the other relay circuit controlling the carriage operating means.

12. In a machine of the class described, the combination with a reciprocably movable pan carriage, a spray gun for spraying a pan with grease during a portion of its movement with the carriage, means for feeding grease to the gun, an air pressure control valve for the gun, and means operable to move the carriage through a predetermined cycle, of scrapers disposed at the spraying side of the carriage and pan to engage and remove grease therefrom during movement of the carriage, said scrapers including electric heaters, two separate electrical controls, one for the grease feeding means and heaters and one for the valve and carriage operating means, the latter control being automatically operable first to close said valve and stop the spraying action of the gun at one point in a cycle of movement of the carriage and then to stop the carriage operating means at another point in such movement.

13. In a pan greasing machine wherein a pan carriage moves over a grease sump and over means in the sump for spraying grease against the under side of the carriage and pans carried thereby in its movement over the sump, a scraper disposed to engage and scrape grease from the under side of parts of said carriage which move over the sump, said scraper including electric heating means to facilitate removal of grease from the carriage parts and its flow from the scraper.

14. In a pan greasing machine wherein a pan carriage moves over a grease sump and over means in the sump for spraying grease against the under side of the carriage and pans carried thereby in its movement over the sump, a scraper disposed to engage and scrape grease from the under side of parts of said carriage which move over the sump, said scraper including a bar disposed transverse to the line of movement of the carriage, scraper members on the bar and means yieldingly mounting the members on the bar.

15. In a pan greasing machine wherein a pan carriage moves over a grease sump and over means in the sump for spraying grease against the under side of the carriage and pans carried thereby in its movement over the sump, a scraper disposed to engage and scrape grease from the under side of parts of said carriage which move over the sump, said scraper including a bar disposed transverse to the line of movement of the carriage and scraper members on the bar together with means yieldingly mounting the scraper members on the bar, said bar constituting an electric heater element, and a controlled electric circuit in which said bar is disposed.

16. In a pan greasing machine wherein a pan carriage moves over grease spraying means and over a grease sump, a pair of spaced scrapers disposed within the upper portion of the sump at each of opposite sides thereof and crosswise of the line of movement of the carriage, said scrapers having scraping engagement with under surfaces of the carriage which move over the sump to remove grease therefrom.

17. In a machine of the class described wherein pans to be greased are movable across the top of a grease sump and a grease gun is provided for spraying grease upward against a pan during such movement, means for forcefully feeding grease from the sump to the spray gun, said means including a screen dividing the sump into an upper and lower chamber, and a rotary agitator operable over said screen to force grease therethrough from the upper to the lower chamber before being delivered to the spray gun, said agitator having flexible fins which pass over the screen in engagement therewith when the agitator is operated.

18. In a machine of the class described wherein a grease sump has an opening in a wall thereof and a spray gun is projected therethrough and provided with a rotatable spray cap within the sump, a sleeve rotatably mounted on the spray gun and projecting through said opening and attached to said spray cap, means without the sump for rotating said sleeve, means without the sump for carrying said spray gun, and means engaging said sleeve and sealing the interior of the sump from said opening.

19. In a machine of the class described wherein a pan carriage is movable over a grease sump and a spray gun is disposed in the sump for spraying grease upward against a pan movable thereover, two separate motors, means driven by one motor for feeding grease from the sump to the spray gun and including a by-pass to the sump and a normally closed valve therein which is opened by predetermined internal pressure, means driven by the other motor for moving the carriage over the sump, manual control means for starting both motors, and means automatically operable at a predetermined point in the movement of the carriage to stop the carriage motor.

20. In a machine of the class described wherein a pan carriage is movable over a grease sump and a spray gun having an air pressure supply line is disposed in the sump for spraying grease upward against a pan movable thereover, two separate motors, means driven by one motor for feeding grease from the sump to the spray gun, means driven by the other motor for moving the carriage forward and backward over the sump, a normally closed valve in said line, manual control means for starting both motors and to open said valve, and means automatically operable at predetermined points in a movement of the carriage to first close said valve and then stop the carriage motor.

21. In a machine of the class described wherein a pan carriage is movable over a grease sump and a spray gun having an air pressure supply line is disposed in said sump for spraying grease upward against a pan movable thereover, electric drive means for the carriage, a normally closed valve in the air supply line to the gun, electrical means operable to open said last means, manual control means for said first and second means, and means automatically operable at predetermined points in a movement of the carriage to first act on said second means to permit a closing of said valve to stop the gun spraying means and to then stop a carriage driving action of the first means.

HAROLD A. ROSELUND.

CERTIFICATE OF CORRECTION.

Patent No. 2,350,708.　　　　　　　　　　　　　　　　　　June 6, 1944.

HAROLD A. ROSELUND.

It is hereby certified that error appears in the printed specification of the above numbered patent requiring correction as follows: Page 5, first column, line 8, for "pump" read --sump--; line 72, before the word "to" insert --facing--; and that the said Letters Patent should be read with this correction therein that the same may conform to the record of the case in the Patent Office.

Signed and sealed this 1st day of August, A. D. 1944.

(Seal)

Leslie Frazer
Acting Commissioner of Patents.